(12) United States Patent
Bier et al.

(10) Patent No.: US 10,379,533 B2
(45) Date of Patent: Aug. 13, 2019

(54) SYSTEM AND METHOD FOR AUTONOMOUS VEHICLE FLEET ROUTING

(71) Applicant: GM GLOBAL TECHNOLOGY OPERATIONS LLC, Detroit, MI (US)

(72) Inventors: Solomon Bier, San Francisco, CA (US); Brooks Reed, San Francisco, CA (US); Ian Rust, San Francisco, CA (US); Drew Allyn Gross, San Francisco, CA (US); Matthias Wisniowski, San Francisco, CA (US); Kevin Chu, San Mateo, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 15/398,577

(22) Filed: Jan. 4, 2017

(65) Prior Publication Data

US 2017/0192437 A1    Jul. 6, 2017

Related U.S. Application Data

(60) Provisional application No. 62/274,577, filed on Jan. 4, 2016, provisional application No. 62/274,586, filed
(Continued)

(51) Int. Cl.
*G05D 1/02* (2006.01)
*G01C 21/34* (2006.01)
(Continued)

(52) U.S. Cl.
CPC ........... *G05D 1/0038* (2013.01); *G01C 21/28* (2013.01); *G01C 21/3438* (2013.01);
(Continued)

(58) Field of Classification Search
None
See application file for complete search history.

(56) References Cited

U.S. PATENT DOCUMENTS

| 2014/0074338 A1 | 3/2014 | Nordbruch |
| 2015/0066284 A1 | 3/2015 | Yopp |

(Continued)

OTHER PUBLICATIONS

U.S. Appl. No. 15/398,552; Non-Final Office Action—dated Mar. 27, 2018.

(Continued)

*Primary Examiner* — Hussein Elchanti
*Assistant Examiner* — Paul A Castro
(74) *Attorney, Agent, or Firm* — Lorenz & Kopf LLP

(57) ABSTRACT

A system and method for providing routing instructions to one or more autonomous vehicles includes identifying a destination of an autonomous vehicle; identifying a starting position or an initial location of the autonomous vehicle; receiving autonomous vehicle sensor data; receiving one or more routing goals for a routing plan for the autonomous vehicle; generating one or more route modification parameters; and generating a route plan for the autonomous vehicle based on (a) the destination, (b) the starting position or the initial location, (c) the one or more route modification parameters and (d) the one or more routing goals.

18 Claims, 9 Drawing Sheets

Related U.S. Application Data on Jan. 4, 2016, provisional application No. 62/302,874, filed on Mar. 3, 2016.

(51) Int. Cl.
  *G05D 1/00* (2006.01)
  *G01C 21/28* (2006.01)
  *G07C 5/00* (2006.01)

(52) U.S. Cl.
  CPC ..... *G01C 21/3461* (2013.01); *G01C 21/3492* (2013.01); *G05D 1/0016* (2013.01); *G05D 1/0027* (2013.01); *G05D 1/0077* (2013.01); *G05D 1/0212* (2013.01); *G05D 1/0238* (2013.01); *G05D 1/0257* (2013.01); *G05D 1/0278* (2013.01); *G05D 1/0287* (2013.01); *G05D 2201/0213* (2013.01); *G07C 5/008* (2013.01)

(56) References Cited

U.S. PATENT DOCUMENTS

| | | |
|---|---|---|
| 2015/0248131 A1 | 9/2015 | Fairfield |
| 2015/0346727 A1 | 12/2015 | Ramanujam |
| 2015/0353033 A1 | 12/2015 | Pribisic |
| 2016/0249180 A1 | 8/2016 | Li |
| 2016/0334797 A1* | 11/2016 | Ross ............... G08G 1/20 |
| 2018/0189717 A1* | 7/2018 | Cao ............... G06Q 50/30 |

OTHER PUBLICATIONS

U.S. Appl. No. 15/398,454; NonFinal Office Action—dated Aug. 29, 2018.

\* cited by examiner

SYSTEM AND METHOD FOR AUTONOMOUS VEHICLE FLEET ROUTING

CROSS-REFERENCE TO RELATED APPLICATIONS

This application claims the benefit of U.S. Provisional Application Ser. No. 62/274,577, filed on 4 Jan. 2016, U.S. Provisional Application Ser. No. 62/274,586, filed on 4 Jan. 2016, and U.S. Provisional Application Ser. No. 62/302,874, filed on 3 Mar. 2016, which are incorporated in their entireties by this reference. This application also incorporates by this reference U.S. patent application Ser. No. 15/398,562 named System and Method for Remotely Assisting Autonomous Vehicle Operation, filed on 4 Jan. 2017.

TECHNICAL FIELD

This invention relates generally to the vehicle automation field, and more specifically to new and useful systems and methods for autonomous vehicle fleet routing.

BACKGROUND

Vehicle automation has been suggested as a means to increase vehicle safety almost as long as cars have been in existence—experiments on autonomy in cars have been conducted since at least the 1920s. Only recently, though, has computer technology advanced enough to make true vehicle automation possible.

Still, autonomous vehicles as implemented or designed today are essentially independent entities—based on input from vehicle passengers, the vehicles travel a set route and typically avoid communication with other autonomous vehicles. At a local level—that is, how vehicles interact with their immediate surroundings—this may be acceptable; however, at a more regional level (e.g., how vehicles decide a route to travel upon), this leaves much to be desired. Autonomous vehicles that can communicate with each other and other sources, as well as be controlled at a fleet level, could better respond to a greater variety of routing goals and produce substantially more coordinated and/or effective routes than any existing system. Thus, there is a need in the vehicle automation field to create systems and methods for autonomous vehicle fleet routing. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

People spend around 42 hours per year sitting in traffic. Estimates around congestion costs in the United States range from $150 to $200 billion per year stemming from lost productivity, gas burned while idling in traffic, and additional wear and tear on vehicles. Traffic's damage to the environment only builds on gridlock's cost to society. Efficiently routed vehicles promise a reduction in all of these traffic consequences.

The embodiments of the present application are directed to systems and methods for autonomous vehicle fleet routing. These systems and methods may increase the ability of autonomous vehicles to operate safely and efficiently on the road, resulting in a safer and more efficient driving experience not just for system adopters, but for drivers everywhere.

1. System for Autonomous Vehicle Fleet Routing

Figure 1:
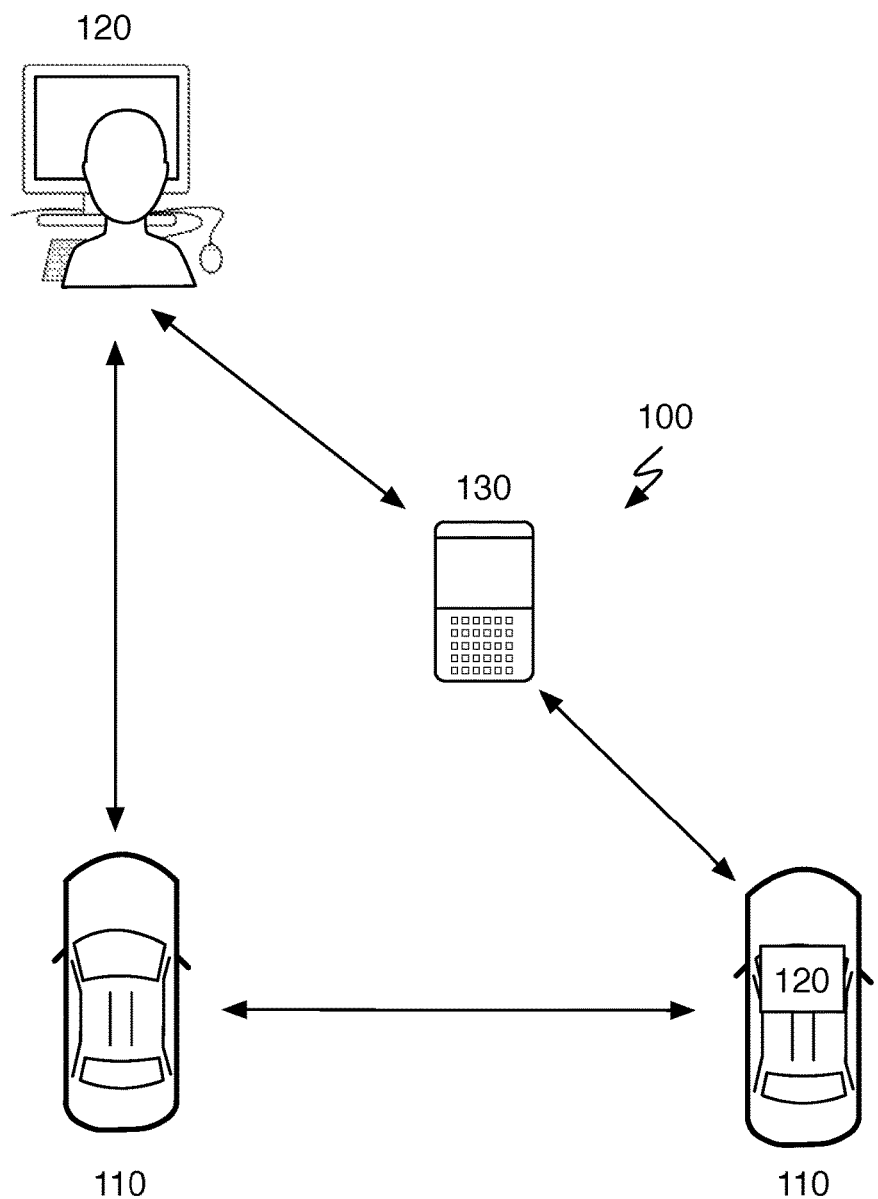
FIG. 1 is a diagram representation of a system of a preferred embodiment.

As shown in FIG. 1, a system 100 for autonomous vehicle fleet routing includes a plurality of autonomous vehicles 110, a user interface 120, and a routing coordinator 130.

The system 100 functions to enable information (e.g., sensor data) gathered by autonomous vehicles to be used to generate information (e.g., route modification parameters) that can be used in the process of route generation or existing route modification to better reach one or more routing goals. For example, the routing coordinator 130 may collect and process position data from a number of autonomous vehicles 110 in real-time to generate a fastest-time route for autonomous vehicles 110 traveling through areas in which said position data is available. Additionally or alternatively, the routing coordinator 130 may use the collected position data to generate a best route for an autonomous vehicle in light of one or more travelling preferences and/or routing goals. In some instances, the best route coincides with or is the same as the fastest-time route for an autonomous vehicle and in other cases, the best route is not the same as the fastest-time route and may be a slower route that meets various traveling preferences.

The routing coordinator 130 may additionally serve as the communication hub for inter-vehicle communication. In this way, a single autonomous vehicle is not receiving signals from too many other autonomous vehicles thereby allowing the single autonomous to preserve bandwidth for effectively communicating with the routing coordinator 130.

Autonomous vehicles 110 may be either or both of recipients (e.g., in terms of routing assistance) and donors (e.g., in terms of providing information to be used in generating routing assistance) to operation of the system 100. In one example, a first autonomous vehicle may be receiving a route from the routing coordinator 130 based on sensor or traveling data provided by a second autonomous vehicle travelling separately from the first autonomous vehicle. In this example, the first autonomous vehicle may be both a recipient of routing instructions and a donor of sensor data while the second autonomous vehicle is merely a donor of information used in route generation to the routing coordinator 130.

Autonomous vehicles 110 are preferably fully autonomous automobiles, but may additionally or alternatively be any semi-autonomous or fully autonomous vehicles; e.g., a boat, an unmanned aerial vehicle, a driverless car, etc. Additionally or alternatively, the autonomous vehicles 110 may be vehicles that switch between a semi-autonomous state and a fully autonomous state and thus, some autonomous vehicles may have attributes of both a semi-autonomous vehicle and a fully autonomous vehicle depending on the state of the vehicle.

In addition to a powertrain (or other movement-enabling mechanism), autonomous vehicles 110 preferably include an onboard computer, a communication interface (e.g., Peplink router), and a sensor suite (e.g., computer vision system, LIDAR, RADAR, wheel speed sensors, GPS, cameras, Applanix system, etc.).

The Applanix system is a form of a GPS system that provides very reliable and highly precise location information that allows an autonomous vehicle to identify its geographic location in the world with extremely high certainty. Typically, each autonomous vehicle includes, at least, four cameras to capture varying still and live views and/or images around the autonomous vehicle. Additionally, the cameras may be used in conjunction with LIDAR of the autonomous vehicle may be additionally configured to detect construction sites and odd traffic or vehicle behaviors, such as the presence of a double-parked car or the like.

Additionally or alternatively, system 100 may implement a machine learning algorithm that automatically learns about and detects construction sites. Generally, the system would 100 would obtain sensor data including any images and other information from one or more autonomous vehicles of the plurality of autonomous vehicles 110. The system 100 may analyze the sensor data to identify any objects or elements within the sensor data that correspond to traditional construction-related objects or equipment. For instance, system 100 can determine a construction site based on identifying one or more orange construction cones from an image or that one or more yellow or similar construction vehicles are located at a particular site. Thus, using the machine learning algorithm, construction sites may be detected automatically (e.g., without human intervention), rather than by a remote human expert or by later review of autonomous vehicle sensor data by a human.

Additionally or alternatively, a machine learning algorithm may be implemented by system 100 to learn traffic patterns of an area. The machine learning algorithm can detect which lanes in an area are slow or fast, areas of most congestions and at what times, areas with easy access to a curb, and the like.

The RADAR of the sensor suite allows for a number of detectable circumstances surrounding the autonomous vehicle. RADAR allow for the detection of depth or extra depth in the circumstances surrounding the vehicle such that when used in combination with one or more other components of the sensor, suite such as the two-dimensional views of the cameras, the autonomous vehicle is able to determine better positioning of objects surrounding the vehicle. For instance, using RADAR, the autonomous vehicle is able to determine when a curb is clear from obstruction by an object, such as another vehicle or the like, in order to determine whether it is possible to travel or park alongside the curb.

The communication interface of each autonomous vehicles functions to allow Internet and inter-vehicle communications. For example, in many autonomous vehicles a Peplink router may form part of the communication interface. The Peplink router may be a highly reliable Wi-Fi router. The Peplink router may be modified to include four cellular connection/communication chips for enabling highly reliable wireless communications (e.g., Internet communications, inter-vehicle communications, etc.) between each of the autonomous vehicles and between an autonomous vehicle and one or more servers used in system 100. In this way, a muxer is formed between the four chips such that signals from the four cellular chips may be combined into one signal over one or more shared mediums. This allows for the distribution of work between these four cellular chips to allow for the highly reliable connection. In one example, the muxer allows for bytes of a single network packet to be divided among the four cellular chips in order to a single cellular chip. If any of the four cellular chips should fail for any reason, the workload of the failed chip can be re-allocated to another of the active cellular chips or distributed (re-balanced) evenly among the remaining active cellular chips thereby allowing for continuity in communication in the event that one or more of the cellular chips fail.

The onboard computer functions to control the operations and functionality of the autonomous vehicles 110 and processes sensed data from the sensor suite and/or other sensors in order to determine states of the autonomous vehicles 110. Based upon the vehicle state and programmed instructions, the onboard computer preferably modifies or controls behavior of autonomous vehicles 110.

The onboard computer is preferably a general-purpose computer adapted for I/O communication with vehicle control systems and sensor systems, but may additionally or alternatively be any suitable computing device.

The onboard computer is preferably connected to the Internet via a wireless connection (e.g., via a cellular data connection). Additionally or alternatively, the onboard computer may be coupled to any number of wireless or wired communication systems including a mesh network of devices, such as a mesh network formed by autonomous vehicles.

The user interface 120 enables an autonomous vehicle user (e.g., a passenger, or a ridesharing platform user who may not be a passenger) to interact with and provide information to an autonomous vehicle. The user interface 120 is preferably a web interface or a native application interface accessible through a mobile electronic device (e.g., a smartphone, a laptop computer, etc.) but may additionally or alternatively be any interface through which a user may communicate with an autonomous vehicle 110 or a system that affects control of an autonomous vehicle 110 (e.g., the routing coordinator 130). For example, a user interface 120 may be a touchscreen in an autonomous vehicle 110. The user interface 120 is preferably any interface capable of receiving user input as described in the section on the method 200. Additionally or alternatively, the user interface 120 may be any interface capable of influencing autonomous vehicle routing; for instance, the user interface 120 may be the user interface of a ridesharing platform that affects ridesharing vehicle demand (as discussed in the section on the method 200).

The routing coordinator 130 functions to provide routing assistance to one or more of the plurality of autonomous vehicles 110. The routing coordinator 130 preferably aggregates sensor data collected by the autonomous vehicles 110 and uses that data to generate information that may be used by the autonomous vehicles 110 to perform routing (or may be used by the routing coordinator 130 to generate routes for the autonomous vehicles 110). In addition to or alternative to sensor data, the routing coordinator 130 may use vehicle demand data (e.g., as estimated from user interface input 120 or another source containing vehicle demand data), traffic data, construction data, event data, limitations data, user provided data, or other data to perform routing or to assist routing.

The routing coordinator 130 is preferably a remote server (or distributed computing system) connected to the autonomous vehicles via an Internet connection, but may additionally or alternatively be any suitable computing system (e.g., a collection of autonomous vehicle computers working as a distributed computing system).

The routing coordinator 130 preferably may take input from autonomous vehicles 110, user interfaces 120, and/or any other source relevant to autonomous vehicle routing. For example, the routing coordinator 130 may take remote expert input from a remote expert as described in U.S. patent application Ser. No. 15/398,562 named System and Method for Remotely Assisting Autonomous Vehicle Operation, filed on 4 Jan. 2017, and U.S. Provisional Patent Application No. 62/274,577, filed on 4 Jan. 2016, the entireties of which are incorporated by this reference.

Data received by the routing coordinator 130 may potentially traverse multiple network hops before being received; e.g., autonomous vehicle sensor data may be sent from a first vehicle to a second vehicle, from the second vehicle to a third vehicle, and from a third vehicle to an internet-enabled base station, before finally being communicated to the routing coordinator 130 via the Internet.

1A. System for Autonomous Vehicle Fleet Routing with Expert Assistance

Figure 1A:
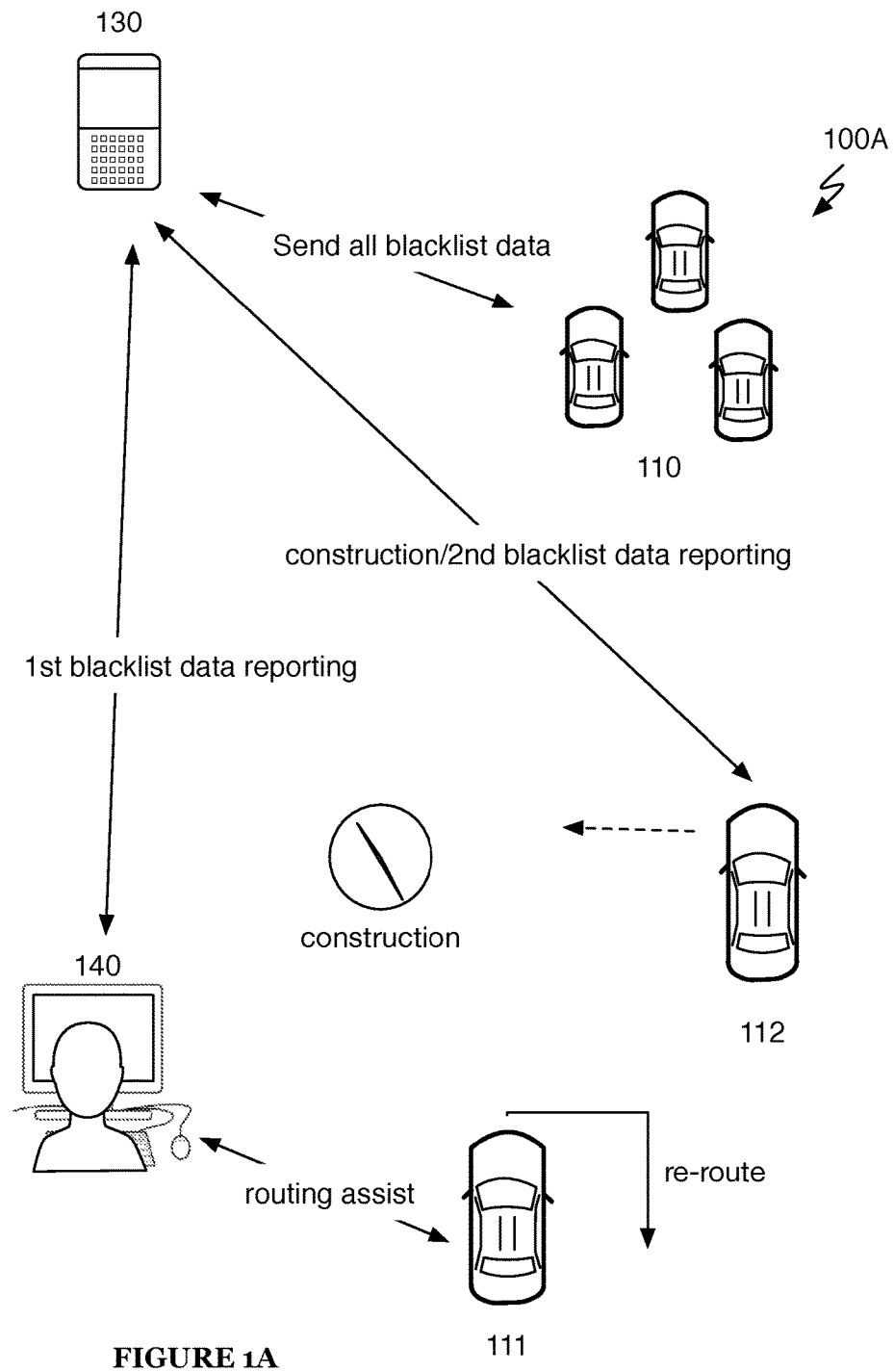
FIG. 1A is a more detailed diagram representation of a system of a preferred embodiment.

FIG. 1A illustrates a representative schematic of a system 100A for autonomous vehicle fleet routing in conjunction with a remote assistance interface (e.g., human expert interface). The system 100A includes similar system components as system 100 shown in FIG. 1, such as a plurality of autonomous vehicles 110, user interfaces 120, and routing coordinator 130. System 100A, however, also includes a remote assistance interface 140.

The remote assistance interface 140 preferably includes one or more displays and various input/output devices. The one or more displays may be touch-sensitive and/or gesture recognition displays, such that routing or other communication input may be provided directly to the display screen and in some instances, communicated directly to autonomous vehicles operating in the field. The remote assistance interface 140 may be implemented using a remote assistance server or the remote assistance interface may be implemented using the same server as the routing coordinator server 130.

The system 100A functions to enable route generation and route modification (e.g., rerouting) of one or more autonomous vehicles with the assistance of the remote assistance interface 140. The remote assistance interface 140 functions to assist an autonomous vehicle in an assistance-desired scenario. In the instances that the assistance-desired scenario requires routing or traveling assistance, a human expert at the remote assistance interface 140 is capable of analyzing the assistance-desired scenario and identify or select a routing or rerouting opportunity for the autonomous vehicle. The assistance provided by the remote assistance interface 140 may be further augmented by an artificially-intelligent (AI) agent implemented via a separate AI server or alternatively, residing at the autonomous vehicle or remote assistance server.

While in many cases, the routing coordinator 130 is able to provide an autonomous vehicle with routing or rerouting instructions, there are some situations in which the routing coordinating server 130 and the onboard computer of the autonomous vehicle are not confidently able to analyze a scenario or circumstances around the autonomous vehicle for the purpose of providing routing or rerouting instructions. In these cases, the human expert at the remote assistance interface 140 may intervene to augment the efforts the autonomous vehicle and the routing coordinator 130.

As an example, an autonomous vehicle may encounter an assistance-desired scenario in which the only possible routing or path for traversing the assistance-desired scenario involves violating one or more traffic laws or violating vehicle travelling norms. These type of assistance-desired scenarios may require that the autonomous vehicle traverse across a double yellow line and into opposing traffic possibly to avoid an accident or a double-parked vehicle or the like. However, in some embodiments, the standard control and/or operational parameters for the autonomous vehicle do not allow for the autonomous vehicle to expressly violate traffic laws and further, the autonomous vehicle may not have internal protocols sufficient to navigate across a double yellow line. In such embodiments, the remote assistance interface 140 may intervene either via request from the autonomous vehicle or automatically by the remote assistance interface 140 without a direct request from the autonomous vehicle.

In response to the assistance-desired scenario, the human expert at the remote assistance interface 140 may take control of the autonomous vehicle in order to traverse the double yellow lines remotely. Alternatively, the remote assistance interface 140 may respond to the assistance-desired scenario by drawing, generating and/or selecting a proposed route for traversing the assistance-desired scenario and transmitting the proposed route to the autonomous vehicle for implementation and/or execution. For instance, the remote assistance interface may re-draw existing boundary lines, such as traffic lines that define a road or travel lane, using a computer interface, such as a touch-sensitive display. In such example, a human expert at the remote assistance interface may use an input tool, such as a drawing pen or their finger, to draw new boundary lines or a new travel lane onto a display showing an actual view of the circumstances around the autonomous vehicle. The redrawn boundary lines once completed or at a time at which the new boundary lines are being drawn by the human expert at the remote assistance interface may be transmitted to be displayed at an interface of the autonomous vehicle, and preferably to be displayed at a corresponding position of a schematic showing the circumstances around the vehicle. Essentially, the human expert is able to draw new lanes for navigating an avoidance scenario on her interface and at the same time or contemporaneous with the drawing by the human expert, the new travel lanes will appear on the interface of the autonomous vehicle. Additionally or alternatively, by drawing the new route by the human expert, remote assistance interface may automatically generate autonomous vehicle control data that will be transmitted to the autonomous vehicle along with or separate from the drawing. The autonomous vehicle control data will preferably include computer instructions, that when executed by the autonomous vehicle, enables the autonomous vehicle to travel along the redrawn boundary lines.

Another assistance-desired scenario may include when the roads are repainted and/or construction in which the autonomous vehicle must drive the wrong direction or path and in another lane, as described similarly above. These types of scenarios may give rise to circumstances in which a two-way road becomes a bi-directional one way shared road that may include traffic signal controllers (e.g., human traffic guidance) and the like. The remote assistance interface 140 may similarly intervene to provide one or more routing options to the autonomous vehicle, including generally rerouting and/or rerouting using redrawn boundary lines to assist the autonomous vehicle in negotiating the scenario.

As an additional step, the remote assistance interface 140 may indicate or flag as blacklisted any of the obstructed routes, lanes, or paths associated with the assistance-desired scenario and additionally, report the blacklist data to the routing coordinator 130 for processing and/or propagating to the fleet of autonomous vehicles.

In a variant implementation of system 100A, a second autonomous vehicle may indicate an avoidance scenario (e.g., construction, high traffic, double-parked vehicles, etc.) to the routing coordinator 130. The routing coordinator 130 may then convert the avoidance scenario into a first blacklist information. Additionally, the remote assistance interface 140 may also provide second blacklist data based on an assistance-desired scenario involving a first autonomous vehicle. The routing coordinator 130 may compile or otherwise, transmit the first and second blacklist data to the entire autonomous vehicle fleet 110.

Figure 6:
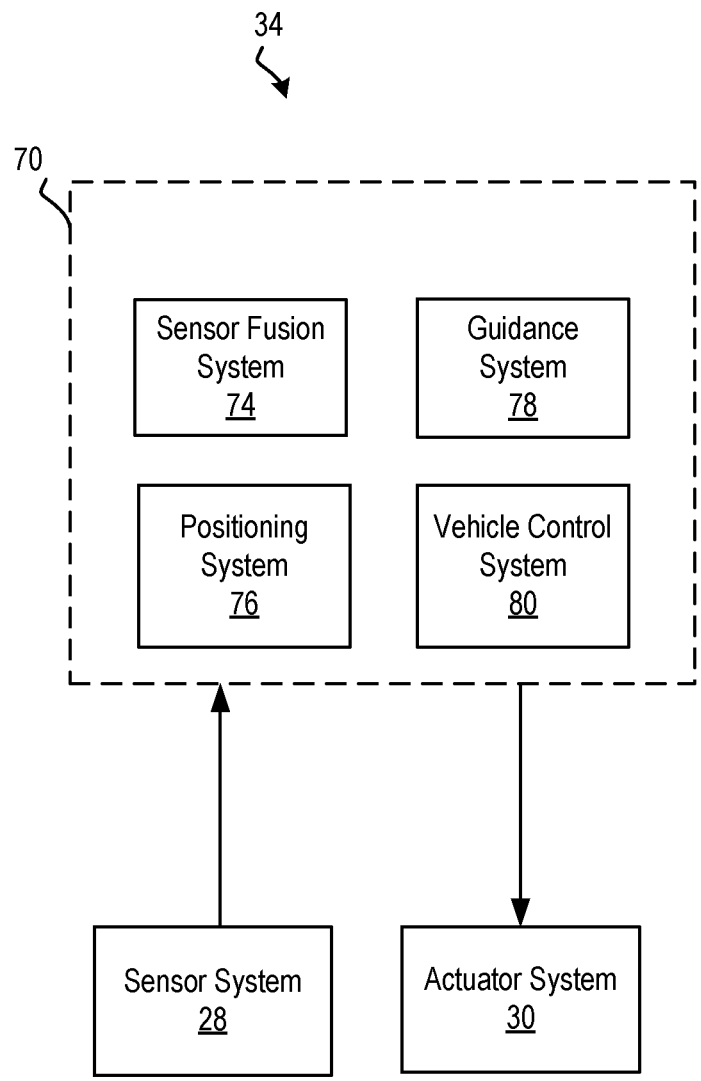
FIG. 6 is a diagram representation of a system of a preferred embodiment.

In accordance with various embodiments, controller 34 implements an autonomous driving system (ADS) 70 as shown in FIG. 6. That is, suitable software and/or hardware components of controller 34 (e.g., processor 44 and computer-readable storage device 46) are utilized to provide an autonomous driving system 70 that is used in conjunction with vehicle 110.

In various embodiments, the instructions of the autonomous driving system 70 may be organized by function or system. For example, as shown in FIG. 6, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 110. In various embodiments, the sensor fusion system 74 can incorporate information from multiple sensors, including but not limited to cameras, LIDARS, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 110 relative to the environment. The guidance system 78 processes sensor data along with other data to determine a path for the vehicle 110 to follow. The vehicle control system 80 generates control signals for controlling the vehicle 110 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

2. Method for Autonomous Vehicle Fleet Routing

Figure 2:
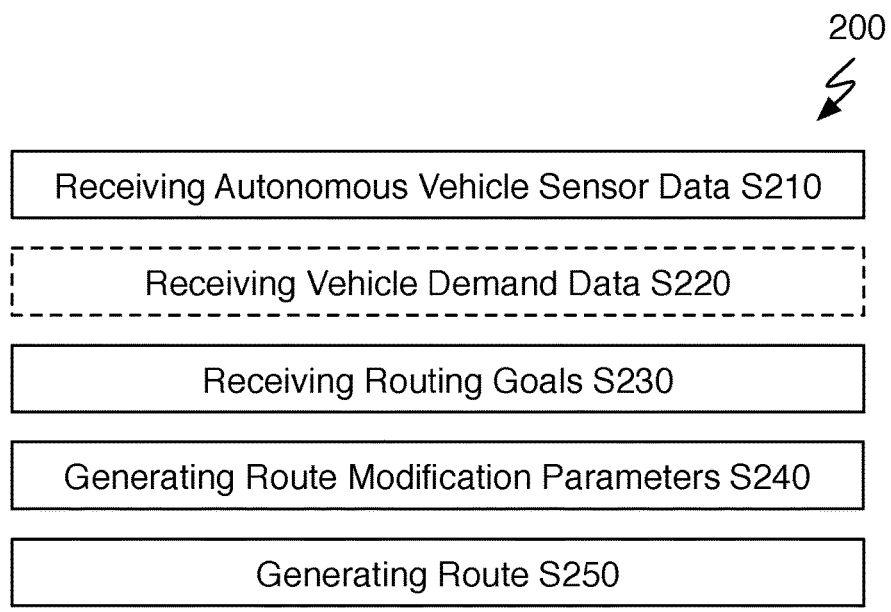
FIG. 2 is a chart representation of a method of a preferred embodiment.

As shown in FIG. 2, a method 200 for autonomous vehicle fleet routing includes receiving autonomous vehicle sensor data S210, receiving routing goals S230, generating route modification parameters S240, and generating a route based on the route modification parameters S250. The method 200 may additionally include receiving vehicle demand data S220. In a variation of a preferred embodiment, the method 200 includes S220 and not S210. The method 200 may additionally include receiving live traffic reporting (including accident reporting) and live construction site reporting data S215.

The method 200 enables intelligence (e.g., sensor data, external service data, etc.) gathered by autonomous vehicles and/or the routing coordinator 130 to be used to generate information (e.g., route modification parameters S240) that can be used in the process of route generation S250 or existing route modification to better reach one or more routing goals. For example, the method 200 may use position data, or position and velocity data, or any other suitable data, from a number of autonomous vehicles in real-time to generate a fastest-time route for vehicles traveling through areas in which said data is available. The method 200 may additionally use a specific geographic area in which the autonomous vehicle is travelling and selectively use or collect information from only other autonomous vehicle in the specific geographic to generate a fastest-time route and/or best route for the autonomous vehicle. Alternatively, rather than using a predetermined or specifically identified geographic area, the method 200 may determine a radius around the subject autonomous vehicle and only collect or use information from autonomous vehicle with a predetermined radius of the subject autonomous vehicle. In this way, only potential pathways or route segments or the like that are immediately or near-immediately available to the autonomous vehicle are considered in the route generation process. Accordingly, in some embodiments, it is beneficial to limit the collected and/or used autonomous vehicle information used in route generation to reduce or eliminate superfluous or unnecessary scenarios that may not necessarily enhance the fastest-time or best route generated for the autonomous vehicle. Rather, when it is known that only certain paths or route in a specific geographic region (which may be represented by a shading or encircling on a map) affect potential routes generated for that specific region or when it is known that traffic or routes within a predetermined distance (e.g., 1-2.5 miles or the like) of an autonomous vehicle is most useful for generated a route for the autonomous vehicle, this geographic and/or radius-distance limitation on the information to be used may significantly improve a quality, reliability, and speed of a route generation by a routing coordinator or the like.

While routing algorithms using data captured by multiple vehicles may exist (e.g., Waze, which provides car routing based on crowd-sourced traffic data), the variety and resolution of data available, which exceeds merely crowd-sourced traffic data, to the method 200 allow it to respond to a greater variety of routing goals and produce substantially more sophisticated routing modifications than any existing algorithm. Further, because the method 200 is directly linked to control of a vehicle (as opposed to a GPS route shown to a human driver), the granularity of routing instruction provided may be greatly increased, just as the response time to such instruction (linked to a maximum frequency of instruction updates) may be greatly decreased. As an added benefit, when multiple vehicles operating the method 200 are present in an area, the vehicles may operate, determine, and set routes cooperatively, as opposed to independently, which may result in significant benefits (e.g., faster transit time, lower environmental impact due to lower fuel usage and associated cost savings).

The method 200 is preferably implemented by the system 100, but may additionally or alternatively be implemented by any system capable of generating and providing route modification parameters to autonomous vehicles. For example, the method 200 may be operable by a set of autonomous vehicles (without dedicated user interfaces or routing coordinators or without a central authority server). In such an example, the set of autonomous vehicles would collectively negotiate a route for one autonomous vehicle in the set using intelligence sensed by each of the autonomous vehicles in the set, as well as information obtained from external sources (e.g., live traffic reporting, live construction data, etc.). Partial processing of the route to be generated may occur across the set of autonomous vehicles and combined for a completed generated route at the subject autonomous vehicles requiring the route. Alternatively, the partial processed parts of the route may be assembled together at a non-subject autonomous vehicle of the set, preferably a vehicle in closest proximity to the subject autonomous vehicle, prior to transmitting the generated route to the subject autonomous vehicle.

Figure 5:
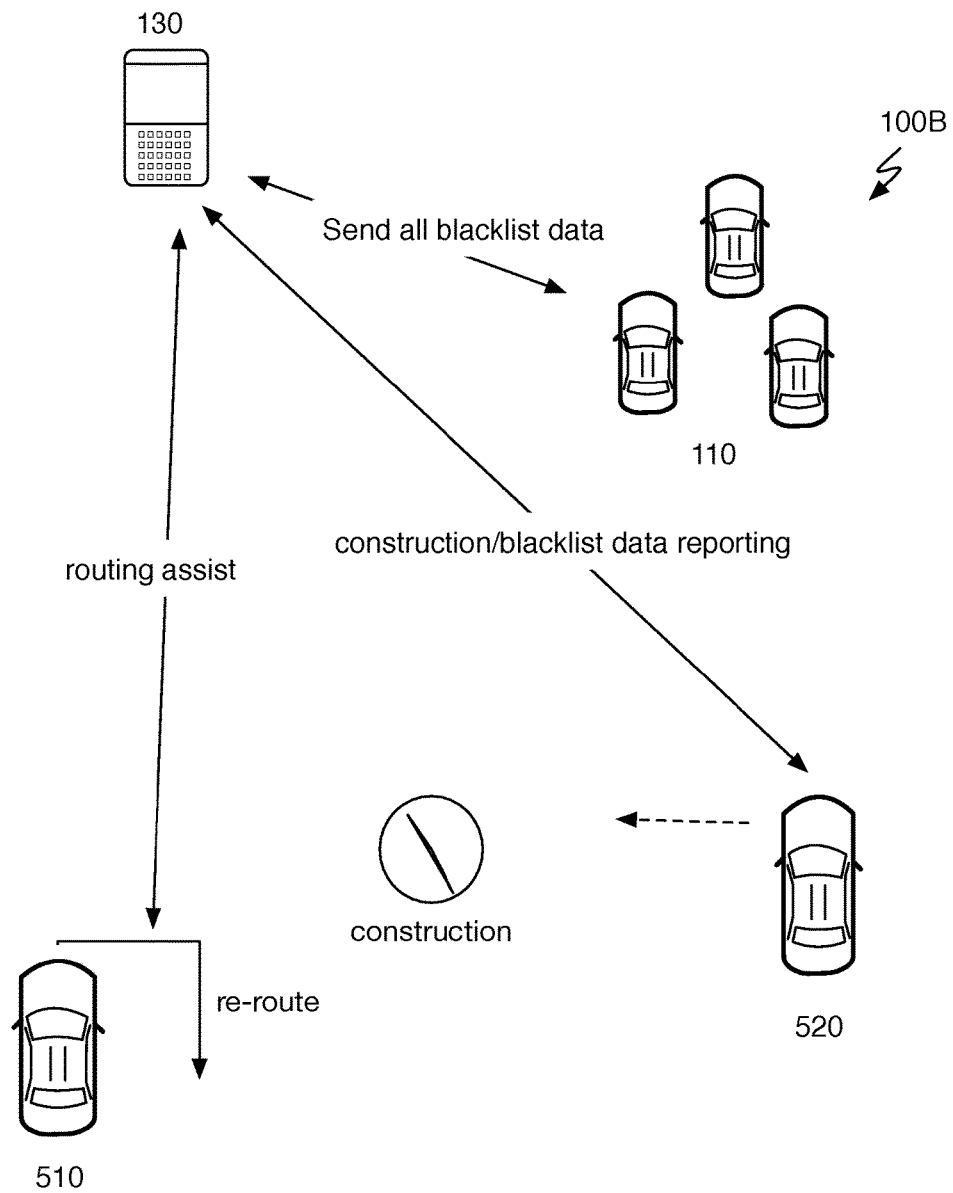
FIG. 5 is a diagram representation of a partial system of a preferred embodiment.

If the method 200 is operating on the system 100, any component of the system 100 may potentially be capable of performing any step of the method 200. For example, the routing coordinator 130 of the system 100 may receive autonomous vehicle sensor data (S210) from a first vehicle, vehicle demand data (S220) from a ridesharing server (or from analysis of user interface 120 requests), and routing goals (S230) from an administrator of the routing coordinator 130 (and/or from a user via user interfaces 120). Likewise, routing modification parameters may be generated by the routing coordinator 130 (S240) and applied to one or more autonomous vehicles 110 by the routing coordinator 130 (S250). As an example, as shown in the schematic representation of a partial system 100B in FIG. 5, an autonomous vehicle 510 requiring a route plan receives a generated route from the routing coordinator 130. Prior to or contemporaneous with generating the route, the routing coordinator 130 may collect construction information (e.g., an avoidance scenario) from another autonomous vehicle 520 and based on receiving the construction information at the routing coordinator 130, the routing coordinator 130 may blacklist a lane or a path leading to a construction site associated with the construction information. Using blacklist information including the blacklist lane or path leading to the construction site, the routing coordinator 130, generates a route plan for the autonomous vehicle 510 and at a same time (e.g., in parallel) or contemporaneously, propagates the blacklist information to other autonomous vehicles in the fleet of autonomous vehicles 110.

The method 200 may find use in a number of autonomous vehicle control scenarios. As a first example, the method 200 may be used in scenarios where the source and destination of autonomous vehicles are independently controlled, serving essentially to provide guidance to a group of vehicles owned by disparate persons or entities. As a second example, the method 200 may be used in scenarios where the source and destination of autonomous vehicles are centrally controlled; here, the method 200 may be used to route vehicles owned or otherwise controlled by a central authority. As a third example, the method 200 may be used in hybrid scenarios—where source and destination are sometimes controlled by a central authority and sometimes controlled by others. One implementation of the third example might be the use of the method 200 in a ridesharing platform scenario, where passengers dictate destination of a ride when present in a vehicle, but the vehicle is directed by a central authority when no passenger is present.

S210 includes receiving autonomous vehicle sensor data. S210 functions to receive information from an autonomous vehicle about the state of the autonomous vehicle and/or the state of the environment around the autonomous vehicle; for example, the speed and heading of the autonomous vehicle, the objects (and their respective trajectories) present in a vicinity of the autonomous vehicle, road conditions, the status of traffic control devices, weather conditions, the presence of construction, the presence of an accident, etc.

Autonomous vehicle sensor data may include any data received from a sensor of the autonomous vehicle and/or any data produced from analysis or processing of sensor data. For example, autonomous vehicle sensor data received in S210 may include sensor data received from one or more of photodetectors, RGB cameras, monochrome visible light cameras, infrared cameras, RADAR, SONAR, LIDAR, GPS, inertial measurement units (IMUs), accelerometers, microphones, strain gauges, pressure monitors, barometers, thermometers, altimeters, etc.

As an example of data processed from autonomous vehicle sensor data, S210 may include receiving analysis of image data captured by an autonomous vehicle (e.g., identifying and tracking other vehicles visible to the autonomous vehicle from the image data). Image analysis may include, for example, distortion correction, filtering, data fusion (e.g., coupling images to other sensor data), image stitching, and/or image feature detection. Data processed from the autonomous vehicle may also include a three-dimensional rendering of circumstances around the autonomous vehicle. The three-dimensional rendering may be generated at the autonomous vehicle and transmitted to a routing coordinator or merely the data for preparing the three-dimensional data may be transmitted by the autonomous vehicle and later rendered at the routing coordinator.

S210 may additionally or alternatively include receiving data corresponding to autonomous vehicle state (or environmental state) not originating from a sensor of the autonomous vehicle. For example, S210 may include receiving weather data from a weather service. As a second example, S210 may include receiving sensor data from an external source; e.g., traffic camera or other image data. As a third example, S210 may include receiving data from a passenger of the autonomous vehicle (e.g., a subjective rating of ride quality) or from another person (e.g., a pedestrian, a police officer). As a fourth example, S210 may include receiving control data (e.g., the set of instructions provided to the autonomous vehicle). As a fifth example, S210 may include receiving analysis data from a remote expert of an autonomous vehicle platform. As a sixth example, S210 may include receiving real-time traffic data from a remote real-time traffic service or server. As a seventh example, S210 may include receiving live-accident reporting data from recent accidents occurring in one or more geographic regions which may affect a generated route plan. As an eighth example, S210 may include receiving live construction reporting data from recent and ongoing construction occurring in one or more geographic regions which may affect a generated route plan. As a ninth example, S210 may include receiving live or predetermined bus routing data. As a tenth example, S210 may include receiving live or historic bike rider traffic data.

S210 may additionally include processing autonomous vehicle sensor data; for example, S210 may include performing the image analysis previously described based on image sensor data received from an autonomous vehicle.

As a second example, S210 may include inferring traffic light timing (e.g., schedules for traffic lights, average wait time for a particular light) from autonomous vehicle sensor data (e.g., image data of the vehicle, GPS data corresponding to vehicle position, analytical data from the autonomous vehicle indicating that the vehicle is stopped due to a traffic signal) on its own or in combination with other data (e.g. historical data, data from other autonomous vehicles recently sensing the relevant traffic light, etc.).

As a third example, S210 may include calculating one or more performance metrics based on autonomous vehicle sensor data on its own or in combination with other data. For example, S210 may include calculating an efficiency metric (e.g., distance per unit of energy used). Performance metrics may additionally or alternatively be based in part on other data, for example, a financial efficiency metric may be calculated from the money made by a vehicle used for ridesharing per unit of energy used by the autonomous vehicle.

S210 may additionally or alternatively include using autonomous vehicle sensor data to measure state or performance of another autonomous vehicle (or another object, e.g., a traffic signal). For example, S210 may include detecting that a particular vehicle (which may or may not be autonomous) is behaving strangely (e.g., weaving in between lanes, stopping suddenly). This data could be used to report the vehicle to authorities or to prompt other autonomous vehicles to avoid the strangely-behaving vehicle. If the strangely-behaving vehicle is an autonomous vehicle, the data may be used to prompt review or manual override of the vehicle. As another example, S210 may include monitoring the external appearance of another vehicle (e.g., used to determine when a vehicle might need maintenance or a car wash). As another example, S210 may include detecting that a traffic signal is out of repair, or that a new pothole has appeared in a road.

S210 preferably includes receiving autonomous vehicle sensor data (or other data identified in the sections describing S210) at an autonomous vehicle control or coordination platform (e.g., a remote server that provides routing assistance and/or directions to autonomous vehicles). Additionally or alternatively, S210 may include receiving autonomous vehicle sensor data at any location; e.g., at the onboard computer of another autonomous vehicle. Autonomous vehicle sensor data may potentially traverse multiple network hops before being received; e.g., autonomous vehicle sensor data may be sent from a first vehicle to a second vehicle, from the second vehicle to a third vehicle, and from a third vehicle to an internet-enabled base station, before finally being communicated to a coordination platform via the internet.

S220 includes receiving vehicle demand data. S220 functions to receive information about vehicle demand (e.g., when, where, and type of autonomous vehicle needed); e.g., where vehicles are needed at some time (or where vehicles are predicted to be needed at a future time). Vehicle demand data preferably includes any data related to the past, future, or present desire for one or more autonomous vehicles to be present in a specific region or at a specific location. Additionally, vehicle demand data preferably includes any data related to the past, present, and/or future desire for one or more types of autonomous vehicles needed. The different types of autonomous vehicles may be based on functionality, size, speed, or other specification for classifying autonomous vehicles. For example, for a ridesharing platform, vehicle demand data may include data on where (and when) open requests for vehicles are initiated. As another example, vehicle demand data may include a predicted number of vehicle requests for a specific geographic region at a future time. For a shipping company, an example of vehicle demand data might include delivery locations and drop-off time windows for delivery vehicles.

Note that the response to vehicle demand data may be different in different autonomous vehicle control scenarios. For example, in a full control scenario (e.g., shipping company), vehicles may simply be directed based on demand. In a partial control scenario (e.g., ridesharing), vehicles may be directed when under control of the central platform or passengers may be incentivized to alter their destination (or add via points). In a no-control situation (e.g., information platform for independently owned autonomous vehicles), passengers may be advised of optional route changes (e.g., in response to demand for something carried by the vehicle, such as a battery charger) and potentially incentivized for allowing said changes.

Vehicle demand data may include vehicle request data, vehicle position data, vehicle velocity data, vehicle location, package delivery data, service demand data, vehicle type data, or any data that relates to need or desire for an autonomous vehicle (e.g., to perform a task). Vehicle demand data may be actual demand (e.g., number of requests in an area), estimated demand, and/or predicted demand.

Estimated vehicle demand data preferably includes any data not directly linked to vehicle demand that may be used to estimate vehicle demand. For example, vehicle demand data may be inferred from traffic data (e.g., how many cars on the road), type-selective traffic data (e.g., how many taxis are on the road), potential passenger observational data (e.g., how many people are on the sidewalks as observed by autonomous vehicles), or any other suitable data. Regardless of the type of data used, estimated vehicle demand data may be processed or analyzed in any manner; for example, potential passenger observational data may be processed to determine the likelihood that persons on a sidewalk are actually potential passengers (e.g., are they facing the street, are they near the curb, etc.)

Predicted vehicle demand data may be calculated from any data source linked to vehicle demand (e.g., historical traffic data, historical actual vehicle demand). Predicted vehicle demand data may be linked to uncontrolled variables (e.g., weather, time of day, data on that may indicate higher anticipated demand such as the timing and location of concerts or sports) but may additionally or alternatively be linked to controlled variables (e.g., number of ridesharing vehicles available in an area, price). This is notable because controlled variables may be modified to achieve a particular predicted demand (which preferably corresponds to a similar actual demand).

S230 includes receiving routing goals. S230 functions to establish a set of parameters that determine which metrics should be considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, S230 may include receiving a routing goal that time of an individual trip for an individual autonomous vehicle be minimized, subject to other constraints. As another example, S230 may include receiving a routing goal that comfort of an individual trip for an autonomous vehicle be enhanced or maximized, subject to other constraints.

Routing goals may be specific or general in terms of both the vehicles they are applied to and over what timeframe they are applied. As an example, of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals may involve trip duration (either per trip, or average trip duration across some set of vehicles and/or times), physics or laws or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

With respect to routing goals relating to comfort and/or passenger satisfaction, these type of routing goals may include a number of passenger or routing coordinator instructions for improving a level of comfort of a ride in an autonomous vehicle. Accordingly, an aim of enhancing comfort of a ride in an autonomous vehicle is to mitigate or reduce maneuvers or segments of a ride that contribute negatively to an ease of a ride including one or more uneasy sensations that may be experienced by a passenger during the ride. Examples of comfort metrics or attributes of a ride that may contribute negatively to comfort include multiple lane changes, curvature of a lane or road, minor/major and major/minor turns, unprotected lefts, zipper mergers, curvature of road that makes turns uncomfortable or jerk too high, number of turns in a path, destinations having an ability to pull over, and the like. These metrics or attributes of a ride in an autonomous vehicle can be minimized or in some cases, increased depending on preferences.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority.

Routing goals and routing goal priorities may be set by any suitable source (e.g., an autonomous vehicle routing platform, an autonomous vehicle passenger).

S240 includes generating route modification parameters. S240 functions to generate parameters that aid understanding of how a route should be modified in response to the autonomous vehicle sensor data and/or the vehicle demand data, as well as the routing goals. In general, route modification parameters preferably link data pertaining to routing goals to a route or part of a route. Additionally or alternatively, route modification parameters may include any data that aids understanding of how a route should be modified based on data received in S210 or S220.

Route modification parameters may be linked with any characteristic that can be used to describe a route or part of a route. For example, route modification parameters may be linked with individual road sections (e.g., streets segmented by block and direction of traffic), roads, geographic regions, direction of traffic, direction of travel (e.g., relative to some landmark or a compass heading), type of road (e.g., freeway, surface road), actions on a road section or at an intersection (e.g., turns, U-turns, waiting at stoplights between road sections), and/or a set of road sections (e.g., a route or part of a route that traverses more than one road).

Route modification parameters are preferably further linked, either directly or indirectly, with routing goals (alternatively, route modification parameters may be unlinked with routing goals). For example, a route modification parameter linking a traffic or traffic delay score to a road section may be linked with a routing goal corresponding to travel time, a routing goal corresponding to energy usage, and/or a routing goal corresponding to arrival time. The link between a route modification parameter and a route or a segment of a route or the like may be established in any manner. For instance, a route modification parameter such as a blacklist parameter may be stored in association with a route segment that is prohibited from being traveled such that when the route segment is identified or selected, an indication that the route segment is blacklisted is automatically populated to a user or indicated to a routing coordinator. Additionally or alternatively, any route or route segment that has been flagged has a blacklisted route segment or blacklisted path may be stored in a table specifically for blacklisted route segments or blacklisted paths. The table may also include other sections related to other circumstances that should be avoided.

Additionally, route modification parameters such as an existence of construction on a route or route segment affecting one or more lanes or the like may also be saved in associated. In a preferred embodiment, a predetermined three-dimensional (3D) map of a geographic region is provided or generated using LIDAR and high precision GPS, such as Applanix. This 3D map may have been created at a previous time in the past possibly using the sensor suites from one or more autonomous vehicles or the like or possibly acquired from an external using. The predetermined 3D map of the geographic region is preferably updated to include route modification parameters such as blacklisted lanes or path, construction areas, accident sites, and the like. The predetermined 3D map may be updated in real-time or near real-time to reflect recently generated route modification parameters or updated values for route modification parameters. Thus, each of the route modification parameters may be represented on the 3D map by superimposing the route modification parameter onto the map or the like. In the case that route generation occurs at a central authority, the 3D map is updated at the central authority (e.g., routing coordinator) and the updated 3D map is then considered in any ongoing or future route generation processes. Additionally, the updated 3D map is transmitted to all autonomous vehicles in a fleet. A technical benefit of augmenting the 3D map of a geographic region with route modification parameters is that all or more route modification parameters may be viewed and additionally accessed from a single source. Thus, a global view of the traffic circumstances of an entire region may be interpreted from a single map. Additionally, processing route modification parameters in a route generation process is simplified because only a single source or database must be accessed for identifying all route modification parameters affecting a particular route, route segment, or geographic region in which a route plan is to be produced.

Figure 3:
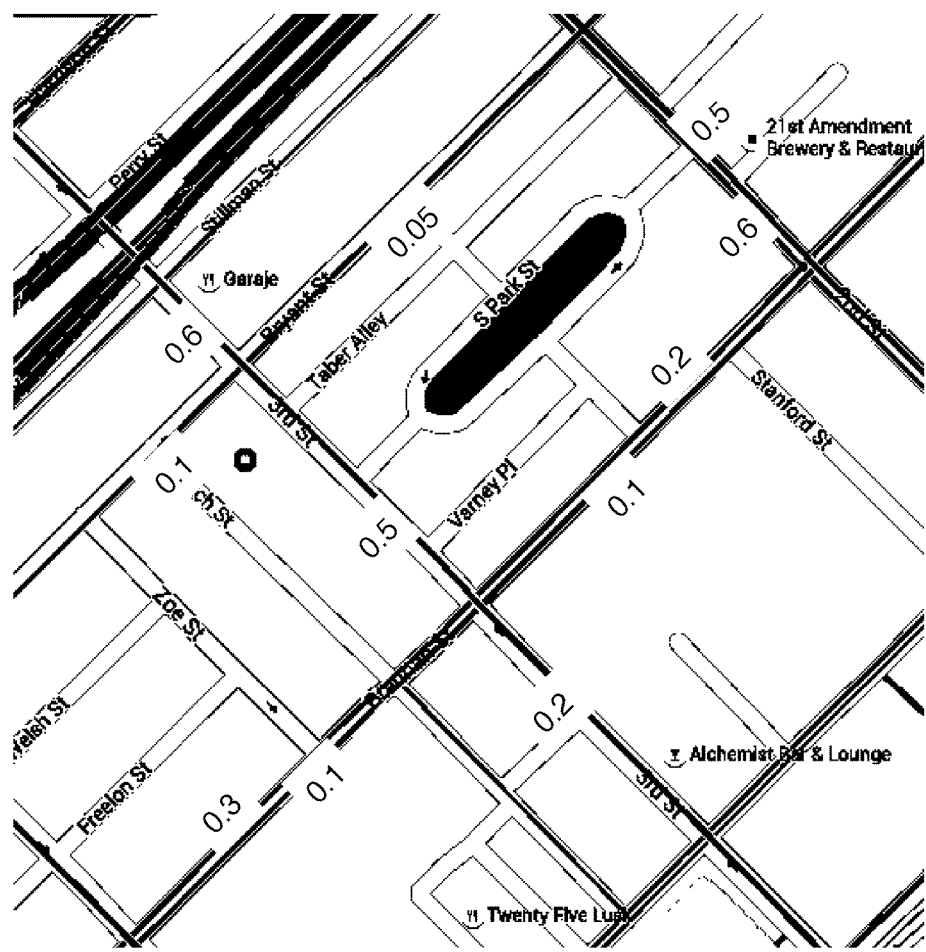
FIG. 3 is an example representation of route modification parameter generation of a method of a preferred embodiment.

As a first example, as shown in FIG. 3, a set of route modification parameters are cost/benefit scores associated with road sections (e.g., streets segmented by block and direction of traffic). These cost/benefit scores preferably define the 'cost' and/or 'benefit' of traveling down a road section. The cost/benefit scores are generated by an evaluation of the autonomous vehicle sensor data captured in S210 and/or the vehicle demand data captured in S220 relative to the routing goals of S230. For example, a road segment may have an overall cost/benefit score that corresponds to a sum of the routing goals weighted by priority (and is based on the data of S220/S230). As another example, a road segment may be associated with a set of cost/benefit scores (e.g., the cost/benefit score for a subset of all routing goals). Cost/benefit scores may be generated in any manner, but preferably reflect how well traveling down an individual road segment contributes to overall routing goals. In this example, traffic data (e.g., captured in S210) may be used to generate road section cost/benefit scores (e.g., to what extent traveling down a road section may affect an autonomous vehicle compared to traveling down other road sections). Alternatively, a "deviation" score may be used to generate road section cost/benefit scores; e.g., a straight line (or other line or set of line segments) may be drawn between a source and a destination, and road sections may be scored based on how much deviation they require from the line (here deviation may be calculated using distance from the line, or estimated time from the line, calculated from said distance, or in any other manner).

Figure 4:
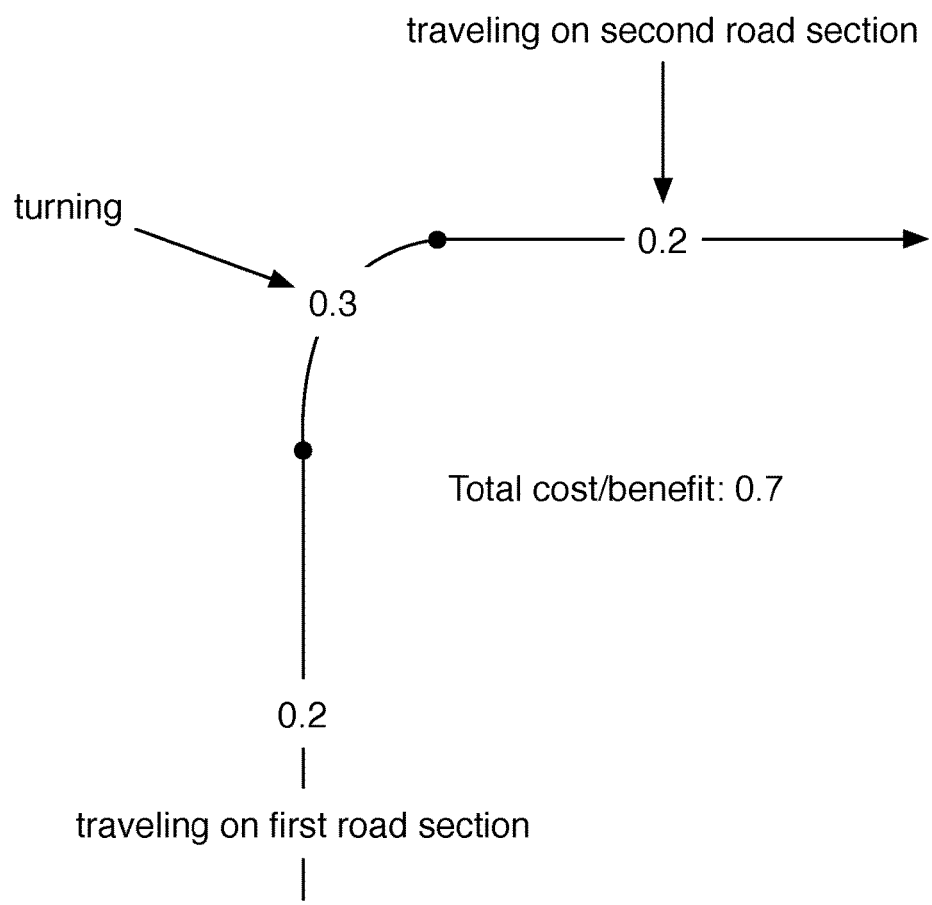
FIG. 4 is an example representation of route modification parameter generation of a method of a preferred embodiment.

As a second example, as shown in FIG. 4, a set of route modification parameters are cost/benefit scores associated with actions linking road sections (e.g., turns). For example, the total cost/benefit for one subsection of a route may be determined by the sum of the cost/benefit scores for the first and second road sections and the cost/benefit score of the turn from the first road section to the second road section (or the cost of potentially waiting at a stoplight between the two sections, even if no turn occurs). In this example, the lower cost/benefit values illustrated in FIG. 4 generally relate to a better route or route segment and higher cost/benefit values are associated with a relatively lower quality route or route segment.

As a third example, a set of route modification parameters are linked with distance (e.g., point-to-point distance, estimated route-to-POI distance) from some point of interest (e.g., a battery charging station). In this example, route modification parameters may be linked to distance/time costs of rerouting to and/or stopping at a point of interest as well as benefits (e.g., increase in battery charge).

As a fourth example, a set of route modification parameters are linked with geographical area. In this example, route modification parameters may include cost/benefit scores calculated for a number of items (e.g., average ridesharing revenue for the area, average travel time through the area, current ridesharing demand in the area, etc.).

As a fifth example, route modification parameters are linked to an action or state of an autonomous vehicle. For instance, route modification parameters may be linked to a vehicle's speed, the lane in which the vehicle is traveling, and/or the proximity of the vehicle to another vehicle. In this example, a route modification parameter may describe a cost/benefit score for a vehicle to travel closely behind another vehicle (this may or may not be dependent on the particular road section).

Note that as routing goals may be linked to multiple autonomous vehicles, route modification parameters for a first autonomous vehicle may be linked to routing goals for a second autonomous vehicle (or a larger set of autonomous vehicles). For instance, a route modification parameter for a first vehicle may be associated with a positive (e.g., good) cost/benefit score linked to an "average travel time across a routing platform" routing goal even if results in an increase in travel time for that particular vehicle. In other words, route modification parameters may suggest that autonomous vehicles take actions or routes that may benefit other autonomous vehicles even if they provide no benefit (or even a cost) to the actor itself (i.e., the autonomous vehicle being routed).

Route modification parameters may be conditional; for example, they may depend on time of day (including estimated time of day; for example, cost/benefit scores for a road section an hour away from a vehicle may be calculated using predicted traffic for that road section an hour from the current time) or type of vehicle (e.g., traffic delays for a motorcycle are often substantially different than for a large passenger vehicle). Route modification parameters may additionally or alternatively be conditional on passenger input.

S250 includes generating a route based on the route modification parameters. Additionally or alternatively, generating a route may be based on a probabilistic algorithm for finding a best route or fastest route. S250 functions to generate a route that performs well at (e.g., meets some threshold for, or outperforms other routes at) meeting the routing goals set in S230 (including prioritization of said routing goals). The extent to which routes meet routing goals may be referred to as a 'route score'.

S250 is preferably an iterative process; that is, first road sections (typically starting from the source and/or destination) for the route are chosen and evaluated by associated route modification parameters and their effect on routing goals, then second road sections (linked to the first road sections) are chosen, and so on, until multiple routes are generated; based on the route scores of these routes, a final route may be chosen. Additionally or alternatively, routes may be generated in any manner, such as by the output of a large graph optimization procedure.

For example, a route modification for an autonomous vehicle may occur when the autonomous vehicle detects (or receives a report of) construction along some street. If a detour is unlikely to dramatically change the route, all route modifications around the construction may be calculated (as opposed to iteratively traversing a 'tree' of route decisions).

S250 preferably includes implementing a probabilistic algorithm for generating a route for an autonomous vehicle. The probabilistic algorithm functions to take into account a probability or likelihood of successfully or unsuccessfully accomplishing one or more maneuvers (e.g., lane changes, turns, etc.) to be taken along a proposed route. Simply, when given a proposed route and the proposed route involves difficult maneuvers, such as a difficult turn or a complex lane change, and the autonomous vehicle is unable to perform the maneuver, the probabilistic algorithm considers how far or how costly it would be to reroute the autonomous vehicle. Typically, a more difficult maneuver to be taken along a proposed route may be associated with a high probability of failure and thus, the cost/benefit of a failure to perform a difficult maneuver along a proposed route must also be calculated and considered in the route generation process.

Many existing pathfinding algorithms aim merely to generate a best path or fastest route, but none of these existing pathfinding algorithms assume failure due to difficult traffic maneuvers along the route. Autonomous vehicles, however, often times encounter difficulties in performing various traffic maneuver while attempting to operate within constraints of traffic laws, whereas human drivers may risk breaking traffic laws and driving aggressively to perform a difficult maneuver. Accordingly, the probabilistic algorithm considers the difficulties in maneuvering by an autonomous vehicle by identifying difficult maneuvers and sufficiently indicating a likelihood of success or failure thereof.

Figure 2A:
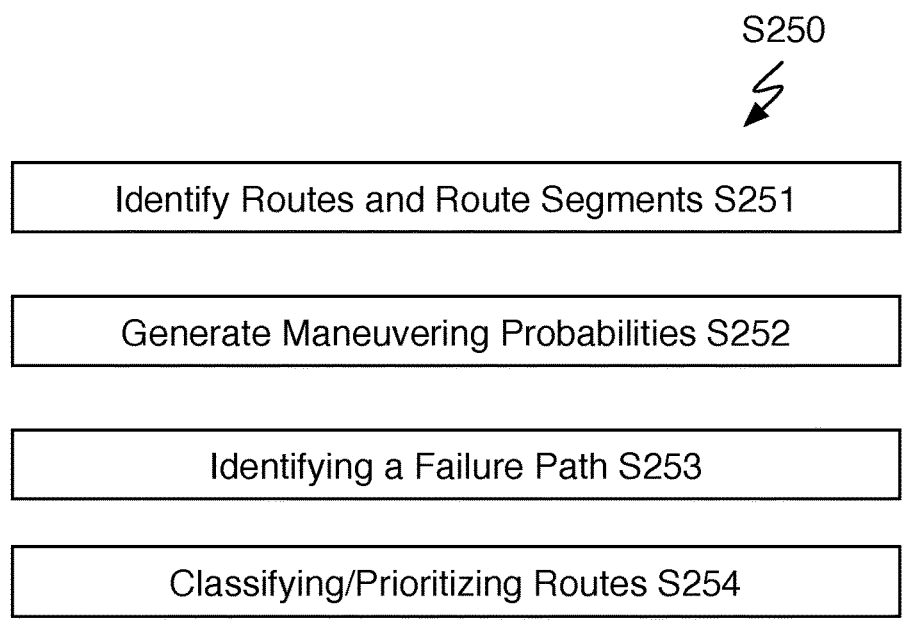
FIG. 2A is a chart representation of a method of a preferred embodiment.

As shown in FIG. 2A, a general process flow of a method 250 is provided for implementing a probabilistic algorithm for route generation. The method 250 includes identifying one or more proposed routes or route segments for an autonomous vehicle S251, analyzing the one or more proposed routes or route segments of the one or more proposed routes and generating for or associating probabilities of failure and/or success for each maneuver within a proposed route or route segment S252, identifying a failure path for a failed maneuver S253, and prioritizing the one or more proposed routes or proposed route segments and/or classify a route or route segment to avoid S254.

S251 functions to identify any proposed routes or proposed route segments that include at least one maneuver. For instance, if a proposed route or proposed route segment comprises a straight path or straight segment, then this type of route path or route segment may include no traveling or driving maneuvers for consideration under the probabilistic algorithm. However, if any portion of a proposed route or a proposed route segment includes a maneuver requiring an operation to change a positioning (e.g., directional positioning or lateral/lane positioning, etc.) of the autonomous vehicle while on the route or route segment, then the proposed route or proposed route segment may be flagged or otherwise, indicated as a route or route segment to be further analyzed using the probabilistic algorithm. If the route or route segment does not include a maneuver, then the proposed route or route segment may skip further analysis under the probabilistic algorithm. It shall be noted that there are other maneuvers that involve parallel parking or the like that may be performed at a source/starting point of a route, a stop along a route, and/or at a destination of a route. In a preferred embodiment, these other maneuvers may be considered separately from the traveling maneuvers or maneuvers performed while an autonomous vehicle is traveling along the route between a source and destination or stop along a route. Alternatively, these terminating, stopping, and/or parking maneuvers may also be considered under the probabilistic algorithm and associated with probabilities of failure and success for purposes of best route generation.

S251 may identify proposed routes or proposed route segments in any manner. In some embodiments, S251 evaluates individual route segments in the order the route segment would appear in a generated route plan. In this way, a route segment having a high(er) probability of success in maneuverability and is a relatively low cost route segment may be automatically selected or included in a route being generated in S250 so that an end point of this automatically selected route segment is considered the base or starting point for a subsequent route segment to be evaluated. This may allow route generation process of S250 to compile together into a complete route plan each individual segment between a source and destination having the best maneuverability and cost attributes.

Additionally or alternatively, S251 may evaluate an entire proposed route for maneuvers and not only individual segments of a proposed route. Evaluating an entire proposed route may increase efficiency in the route generation process.

Once proposed routes or proposed route segments are identified, S252 serves to identify a type of maneuver involved in a proposed route or proposed route segment and associate or generate a probability of success and/or a probability of failure to the subject proposed route or subject proposed route segment. For instance, S251 may associated a maneuver type/name with each maneuver identified. Accordingly, S252 may reference a list of known maneuvers and associated an identified maneuver in a route or route segment with a known maneuver on the list. Example of known maneuvers include single or multiple lane changes in high or slow moving traffic area, U-turn, turn on a high curvature lane or road, turn on a low curvature lane or road, minor/major and major/minor turns, an unprotected left, a zipper merger, etc. Each of the known maneuvers on the list may be associated with a predetermined probability of success and/or failure value. It shall be noted that while in many cases, each of the known maneuvers on the list may be associated with a predetermined probability of success and/or failure, these predetermined values may be dynamically modified to take in account present or current traffic, accident, and construction data or the like which may increase or decrease the associated probability of success and/or failure. Thus, in some embodiments, the probability of success and/or failure is a dynamic value. Additionally or alternatively, the predetermined success or failure values be modified or substituted based on the dynamic values. Accordingly, known maneuvers in the list may be reassigned new values or updated periodically or continuously.

Additionally or alternatively, the known maneuvers list may have several values for each type of recognized maneuver. Accordingly, a particular maneuver on a route segment may be assigned different values for certain time blocks in a day. For instance, a turning maneuver may be assigned first failure/success probability values of 0.7/0.3 for the time block of 8 a.m. to 12 p.m., second failure/success probability values of 0.6/0.4 for the time block of 12:01 p.m. to 3 p.m., and third failure/success probability values of 0.4/0.6 for the time block 7 p.m. to 12 a.m. In this example, an autonomous vehicle has a higher chance of failure in the time block of 8 a.m. to 12 p.m. and highest chance of success in the time block of 7 p.m. to 12 a.m.

Additionally or alternatively S252 may generate a probability of success and/or a probability of failure to a route segment based on historical (e.g., past), present, and/or estimated maneuvering data obtained from autonomous vehicles operating in the field and/or from external traffic data sources. Thus, the success or failure probabilities of a route segment may be determined separate from the known maneuver list or other list having predetermined success or probability values for performing a maneuver.

Additionally or alternatively, S252 may generate a composite success or failure probability for a proposed route or proposed route segment using at least the probability or success probabilities associated with a known maneuvers list or similar list and the success or failure probabilities generated based on historical, present, and/or estimated maneuvering data. Each component of the composite may be weighted in any manner. In some embodiments, the actual success or failure for maneuvering at a specific segment or within a particular route is weighted more heavily than other values used in the composite since the actual data may provide a better indicator of future success or failures of a maneuver.

S253 includes identifying a failure path and associated cost(s) thereof. The failure path is preferably an alternative path having a higher cost than a path associated with a successful maneuver but is the next lowest cost path to the destination of the autonomous vehicle that should be taken by the autonomous vehicle if or when the autonomous vehicle fails to perform a maneuver along a proposed route or proposed route segment. Thus in S253, at each maneuver point, a probabilistic cost is calculated for an autonomous vehicle successfully performing a maneuver at the maneuver point and a probabilistic cost is calculated for the failure path if the autonomous vehicle fails to perform the maneuver resulting in an overall probabilistic maneuver cost [(probability of success*success cost)+(probability of failure*failure cost)]. The success cost and the failure cost may be any type of cost associated with a particular route or route segment. For instance, the success cost and the failure cost may relate to environmental impact costs, costs associated with the distance to be traveled on a route, time and efficiency costs, etc. The probabilistic cost for successful performing the maneuver is the probability of success multiplied by a remaining distance of the proposed route. Similarly, the probabilistic cost for the failure path is the probability of failure (e.g., 1−success probability=failure probability) multiplied by a remaining distance of the alternative route.

Figure 2B:
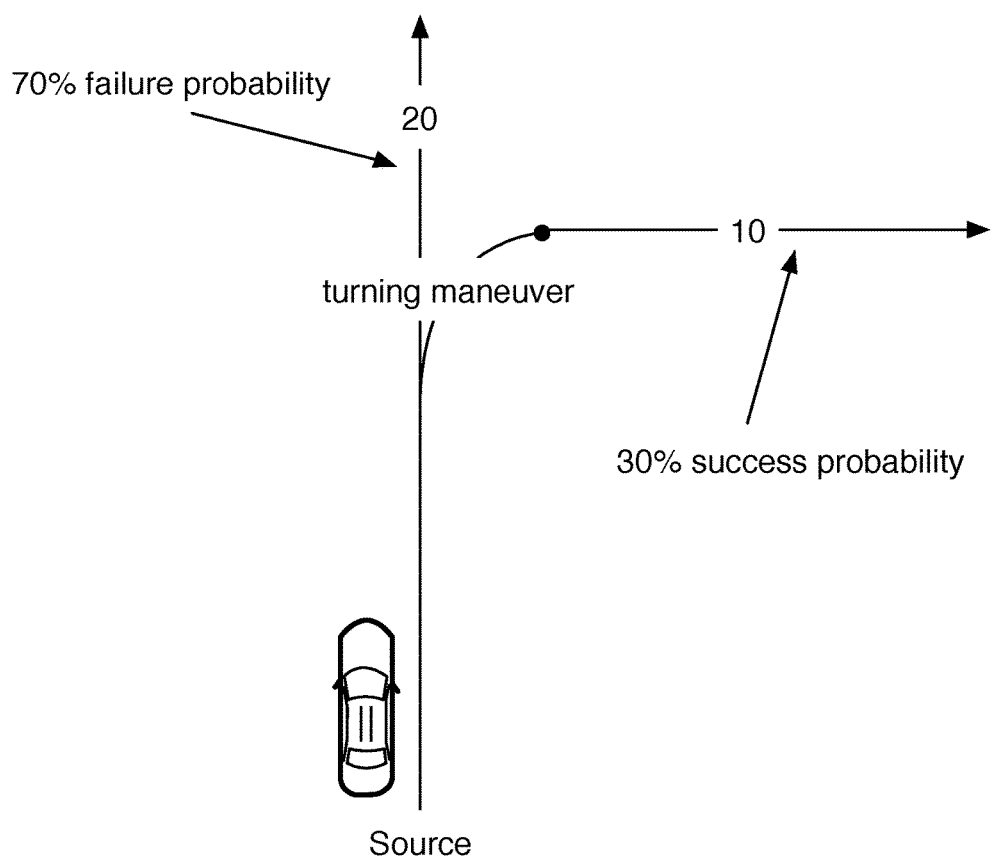
FIG. 2B is an example representation of probabilistic algorithm implementation on a proposed route of a preferred embodiment.

FIG. 2B illustrates an example in which the probability of success is 30% or 0.3 and the success cost, e.g., remaining distance on the proposed route beyond the maneuvering point, is 10 miles. In this example, the probabilistic cost of success is 0.3*10, which equals 3. On the other hand, the probability cost of failure is 70% or 0.7 and the failure cost, e.g., remaining distance to the destination of the failure path, is 20 miles. In the case of failure, the probability cost is 0.7*20, which equals 14. To determine the overall probabilistic maneuver cost, the probabilistic failure cost and the probabilistic success cost of this example are summed together (i.e., 0.3*10+0.7*20=17), which equals 17. Accordingly, in this example, the probabilistic maneuver (e.g., lane change) cost of 17 is much closer to the remaining distance value of 20 of the failure path indicating that the cost of failure for making the maneuver may be very high and possibly resulting in a much longer and costly route. In this example, the cost of failing the maneuver may be so high that the route generation process of S250 may eliminate this route segment or proposed route or prioritize this route segment or route option lowly S254.

Additionally or alternatively, failure thresholds may be implemented in S254 for identifying a proposed route or proposed route segment that an autonomous vehicle should avoid. In such cases, the probabilistic maneuvering cost for a maneuvering point in a route or route segment may be calculated and compared against a failure threshold. If or when the probabilistic maneuvering cost exceeds the failure threshold, S254 may function to flagged the route or route segment or otherwise, add the route or route segment to an avoidance list or the like.

Note that S250 is not necessarily performed on the same vehicle that collects autonomous vehicle sensor data. For example, S250 may be used to calculate a route for a vehicle based on sensor data captured by other autonomous vehicles. This provides autonomous vehicles with a 'fleet intelligence' that enables the vehicles to make decisions based on information and/or past decisions received from other autonomous vehicles or other sources (such as an autonomous vehicle platform or a remote expert).

S250 may additionally or alternatively include presenting several route options to a user (e.g., a passenger, a remote expert, or another entity). For example, S250 may include presenting several route options to a user to select based on a set of variables (e.g., route speed and trip cost, for example). For example, a passenger may be incentivized to take a detour for the autonomous vehicle to perform some task (e.g., recharge or change batteries, deliver a package, pick up another passenger).

S250 may additionally or alternatively select routes based on user preferences (e.g., stored in a user profile). For example, some users may prefer getting to a destination as fast as possible, while other users may prefer arriving at a destination at an arrival time with high confidence. These preferences may be factored into route calculations as routing goals, but may additionally or alternatively be used to select from several routes generated using routing goals not including said preferences.

S250 may additionally or alternatively include instructing and/or controlling the autonomous vehicle to follow a route generated by S250 (or received from any other source). Likewise, the route data used in S250 may include any suitable control data for the autonomous vehicle (e.g., speed, direction, application of braking, acceleration). This aspect of S250 may provide differentiation from routes displayed to a person driving a vehicle; for instance, it may be difficult or even impossible to instruct a person to maintain a lateral g-force of less than 1.2 while simultaneously instructing them to maintain a set speed and perform certain driving instructions. Further, the much faster reaction time of an autonomous vehicle than a person may allow the vehicle to make quicker changes. Further, the method 200 may additionally include collecting sensor data even after a route has been implemented; for example, to test a hypothesis of whether a particular route meets a routing goal (or to record how well a set of decisions meets a routing goal).

The method of the preferred embodiment and variations thereof can be embodied and/or implemented at least in part as a machine configured to receive a computer-readable medium storing computer-readable instructions. The instructions are preferably executed by computer-executable components preferably integrated with autonomous vehicles. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system providing routing instructions to one or more autonomous vehicles, the system comprising:
   a subject autonomous vehicle requiring a route plan, the subject autonomous vehicle providing sensor data from the subject autonomous vehicle;
   a fleet of vehicles comprising a plurality of autonomous vehicles different from the autonomous vehicle, wherein each of the plurality of autonomous vehicles provide sensor data from the plurality of autonomous vehicles;
   a routing server, including a computer processor, that:
      collects sensor data from the subject autonomous vehicle and sensor data from the plurality of autonomous vehicles;
      identifies source and destination data of the subject autonomous vehicle;
      generates the route plan for the autonomous vehicle based on sensor data from the subject autonomous vehicle, sensor data from the plurality of autonomous vehicles, and source and destination data of the subject autonomous vehicle, and
      controls movement of the autonomous vehicle in accordance with the route plan that is generated;
   wherein the routing server generates the route plan for the autonomous vehicle by:
   applying a probabilistic algorithm to one or more route segments of one or more proposed route plans, by:
   identifying proposed maneuvers in the one or more route segments;
   assigning to each proposed maneuver a probability of success and a probability of failure of accomplishing the proposed maneuver by the autonomous vehicle;
   associating a path of failure with the probability of failure and path of success with the probability of success;
   identifying (a) a probabilistic cost of the path of failure and (b) a probabilistic cost of the path of success; and
   identifying a probabilistic maneuver cost based on the sum of (a) the probabilistic cost of the path of failure and added to (b) the probabilistic cost of the path of success; and
   identifying one or more route segments for the route plan of the autonomous vehicle based on the probabilistic maneuver cost based on the application of the probabilistic algorithm.

2. The system of claim 1, further comprising:
   a remote assistance interface that is configured to remotely assist the one or more autonomous vehicles, wherein the remote assistance interface is different from the routing server, and
   wherein the routing server collects remote assistance data from the remote assistance interface and generates the route plan for the autonomous vehicle further based on the collected remote assistance data.

3. The system of claim 1, further comprising:
   a plurality of user interfaces, wherein the routing server collects vehicle demand data from the plurality of user interfaces or a ride sharing platform, and
   wherein the routing server generates the route plan for the autonomous vehicle further based on the collected vehicle demand data.

4. The system of claim 1, wherein:
   the path of success comprises a first path to reach the destination given that the proposed maneuver has been performed correctly; and
   the path of failure comprises a second path to reach the destination, given that the proposed maneuver has not been performed correctly.

5. The system of claim 4, wherein:
   the path of success comprises a cost-optimized first path to reach the destination given that the proposed maneuver has been performed correctly; and
   the path of failure comprises a cost-optimized second path to reach the destination, given that the proposed maneuver has not been performed correctly, such that the cost-optimized second path has a higher probabilistic cost than the cost-optimized first path but a lower score probabilistic cost as compared with all other paths in which the maneuver has not been performed correctly, wherein the probabilistic cost is associated with travelling down a road section.

6. The system of claim 5, wherein the probabilistic maneuver cost is equal to the summation of (a) a probability of success for the maneuver multiplied by a success cost for the maneuver, for the cost-optimized first path added to (b) a probability of failure for the maneuver multiplied by a failure cost for the maneuver, for the cost-optimized second path.

7. A method providing routing instructions to an autonomous vehicle, the method comprising:
   identifying a destination of the autonomous vehicle;
   identifying a starting position or an initial location of the autonomous vehicle;
   receiving autonomous vehicle sensor data;
   receiving one or more routing goals for a routing plan for the autonomous vehicle;
   generating one or more route modification parameters; and
   generating a route plan for the autonomous vehicle based on the destination, the starting position or the initial location, the one or more route modification parameters and the one or more routing goals, via a computer processor; and
   controlling movement of the autonomous vehicle in accordance with the route plan that is generated, via the computer processor;
   wherein generating the route plan for the autonomous vehicle includes, via the computer processor:
   applying a probabilistic algorithm to one or more route segments of one or more proposed route plans, and
   identifying one or more route segments for the route plan of the autonomous vehicle based on the application of the probabilistic algorithm;
   wherein applying the probabilistic algorithm includes:
      identifying proposed maneuvers in the one or more route segments;
      assigning to each proposed maneuver a probability of success and a probability of failure of accomplishing the proposed maneuver by the autonomous vehicle;

associating a path of failure with the probability of failure and path of success with the probability of success; and identifying (a) a probabilistic cost of the path of failure and (b) a probabilistic cost of the path of success;

wherein applying the probabilistic algorithm further includes identifying a probabilistic maneuver cost based on the sum of (a) the probabilistic cost of the path of failure and added to (b) the probabilistic cost of the path of success, and wherein generating the route plan for the autonomous vehicle is further based on the probabilistic maneuver cost.

8. The method of claim 7, further comprising:

receiving vehicle demand data, the vehicle demand data indicating one or more desires or estimated desire for the autonomous vehicle to be present in a specific region or a specific location.

9. The method of claim 7, wherein the routing goals establish a set of routing parameters that identify metrics from an analysis of the sensor data that are considered in determining routes or route modifications for the routing plan of the autonomous vehicles.

10. The method of claim 7, further comprising:

receiving blacklist data from a remote assistance interface, wherein blacklist data identifies one or more conditions or events rendering one or more lanes or one or more road segments not available to be used in generating the route plan for the autonomous vehicle.

11. The method of claim 7, further comprising:

receiving avoidance scenario data from one or more autonomous vehicles in a fleet of autonomous vehicles, wherein the fleet includes a plurality of autonomous vehicles other than the autonomous vehicle for which the route plan is generated, generating blacklist data from the avoidance scenario data, wherein blacklist data identifies one or more conditions or events rendering one or more lanes or one or more road segments not available to be used in generating the route plan for the autonomous vehicle;

wherein generating the route plan for the autonomous vehicle is further based on the identified blacklist data.

12. The method of claim 7, wherein receiving autonomous vehicle sensor data includes:

receiving sensor data from the autonomous vehicle, receiving sensor data from a fleet of autonomous vehicles, wherein the fleet includes a plurality of autonomous vehicles other than the autonomous vehicle for which the route plan is generated, and wherein generating the route plan for the autonomous vehicle is further based on both sensor data from the autonomous vehicle and the fleet of autonomous vehicles.

13. The method of claim 7, wherein the destination of the autonomous vehicle and the starting position or the initial location of the autonomous vehicle for the route plan are identified by disparate entities, generating autonomous vehicle control data based on the generated route plan for the autonomous vehicle, and controlling autonomous vehicles even when the destination and the initial starting position or initial location of the autonomous vehicle for the route plan are identified by disparate entities.

14. The method of claim 7, wherein the autonomous vehicle sensor data comprises data relating to a state of the autonomous vehicle and a state of circumstances around the autonomous vehicle.

15. The method of claim 7, further comprising:

receiving construction data and traffic data, wherein generating the route plan for the autonomous vehicle is further based on the construction data and the traffic data.

16. The method of claim 7, wherein:

the path of success comprises a first path to reach the destination given that the proposed maneuver has been performed correctly; and the path of failure comprises a second path to reach the destination, given that the proposed maneuver has not been performed correctly.

17. The method of claim 16, wherein:

the path of success comprises a cost-optimized first path to reach the destination given that the proposed maneuver has been performed correctly; and the path of failure comprises a cost-optimized second path to reach the destination, given that the proposed maneuver has not been performed correctly, such that the cost-optimized second path has a higher probabilistic cost than the cost-optimized first path but a lower probabilistic cost as compared with all other paths in which the maneuver has not been performed correctly, wherein the probabilistic cost is associated with travelling down a road section.

18. The method of claim 17, wherein the probabilistic maneuver cost is equal to the summation of (a) a probability of success for the maneuver multiplied by a success cost for the maneuver, for the cost-optimized first path added to (b) a probability of failure for the maneuver multiplied by a failure cost for the maneuver, for the cost-optimized second path.

* * * * *